(12) United States Patent
Kim

(10) Patent No.: US 10,941,817 B2
(45) Date of Patent: Mar. 9, 2021

(54) CLUTCH CAM FOR PUMPING DEVICE

(71) Applicant: HYUNDAI TRANSYS INCORPORATED, Seosan-si (KR)

(72) Inventor: Won Kim, Suwon-si (KR)

(73) Assignee: HYUNDAI TRANSYS INCORPORATED, Seosan-si (KR)

(*) Notice: Subject to any disclaimer, the term of this patent is extended or adjusted under 35 U.S.C. 154(b) by 0 days.

(21) Appl. No.: 15/930,754

(22) Filed: May 13, 2020

(65) Prior Publication Data

US 2020/0386280 A1 Dec. 10, 2020

(30) Foreign Application Priority Data

Jun. 4, 2019 (KR) .................. 10-2019-0065804

(51) Int. Cl.
*F16D 23/12* (2006.01)
*B60N 2/18* (2006.01)
*F16D 125/28* (2012.01)

(52) U.S. Cl.
CPC .............. *F16D 23/12* (2013.01); *B60N 2/186* (2013.01); *F16D 2023/123* (2013.01); *F16D 2125/28* (2013.01); *F16D 2250/0076* (2013.01)

(58) Field of Classification Search
CPC ...... F16D 23/12; F16D 23/123; F16D 125/28; F16D 2250/0076; F16D 41/00–36; B60N 2/1635–168; B60N 2/1857; B60N 2/186
USPC ...................................... 192/70.23
See application file for complete search history.

(56) References Cited

U.S. PATENT DOCUMENTS

| 8,016,357 | B2 * | 9/2011 | Figueras Mitjans | A47C 7/58 297/374 |
| 8,292,367 | B2 * | 10/2012 | Park | B60N 2/168 297/344.12 |
| 8,348,344 | B2 * | 1/2013 | Richard | B60N 2/167 297/344.12 |
| 8,820,501 | B2 * | 9/2014 | Hur | B60N 2/167 192/15 |

(Continued)

FOREIGN PATENT DOCUMENTS

| GB | 1224079 A * | 3/1971 | ........... B60N 2/1889 |
| KR | 10-0921849 B1 | 10/2009 | |

(Continued)

*Primary Examiner* — Charles A Fox
*Assistant Examiner* — Tracey E. Bell
(74) *Attorney, Agent, or Firm* — Novick, Kim & Lee, PLLC; Jae Youn Kim; Jihun Kim

(57) ABSTRACT

Proposed is a clutch cam for a pumping device, wherein the shape of the clutch cam and the coupling structure between the clutch cam and parts coupled thereto are changed to reduce manufacturing cost and improve assembly performance. The clutch cam includes: a cam part having a cam profile provided along an outer circumferential surface thereof relative to a rotating axis of a center thereof; a first protrusion part provided on a side of the cam part by protruding therefrom toward the lever bracket on the same rotating axis as the rotating axis, and fitted to a fixing hole provided in the lever bracket; and a second protrusion part provided on the side of the cam part by protruding therefrom toward the lever bracket on the same rotating axis as the rotating axis, and fitted to an angle determination hole provided in the housing.

13 Claims, 11 Drawing Sheets

(56) References Cited

U.S. PATENT DOCUMENTS

| | | | |
|---|---|---|---|
| 10,077,156 B2* | 9/2018 | Fourney | B65G 15/62 |
| 10,661,685 B2* | 5/2020 | Kim | F16D 41/06 |
| 2019/0225121 A1* | 7/2019 | Chiang | B60N 2/682 |

FOREIGN PATENT DOCUMENTS

| | | |
|---|---|---|
| KR | 10-2014-0016064 A | 2/2014 |
| KR | 10-1607203 B1 | 3/2016 |
| KR | 10-1947534 B1 | 2/2019 |

\* cited by examiner

CLUTCH CAM FOR PUMPING DEVICE

CROSS REFERENCE TO RELATED APPLICATION

The present application claims priority to Korean Patent Application No. 10-2019-0065804, filed Jun. 4, 2019, the entire contents of which is incorporated herein for all purposes by this reference.

BACKGROUND OF THE INVENTION

Field of the Invention

The present invention generally relates to a clutch cam for a pumping device, wherein the shape of the clutch cam and the coupling structure between the clutch cam and parts coupled thereto are changed to reduce manufacturing cost and improve assembly performance.

Description of the Related Art

A seat pumping device for a vehicle is a device mounted to a seat such that a seat occupant manually adjusts the height of a seat cushion according to the body type of the seat occupant. When the seat occupant manipulates a lever handle mounted to the side of the seat cushion clockwise or counterclockwise, the manipulating force of the lever handle is transmitted to a link device through the seat pumping device so that the seat cushion is raised or lowered in correspondence to the manipulating direction of the lever handle, whereby the height of the seat cushion is adjusted.

FIG. 1 is an exploded view illustrating a conventional seat pumping device for a vehicle.

Referring to FIG. 1, the conventional seat pumping device includes: a lever bracket 100 provided to be rotated integrally to the lever handle (not shown) manipulated by a user; a return spring guide 110 to which a return spring 112 providing an elastic restoring force to the lever bracket 100 is received; a housing 120 having the shape of a drum 122 and provided inside the seat cushion (not shown); a clutch device 130 received into the housing 120 and transmitting a rotation manipulating force of a user input from the lever bracket 100; a brake device 140 blocking torque input in reverse and maintaining the adjusted height of the seat cushion; and a housing cover 150 coupled to a side of the housing 120 to cover the housing 120.

More specifically, a clutch cam 134 of the clutch device 130 is required to be coupled to the lever bracket 100 such that a rotating force provided from the lever bracket 100 can be supplied to the clutch device 130.

To this end, multiple coupling protrusions 135 are provided on a side surface of the clutch cam 134 along a circumferential direction thereof relative to the rotating axis thereof; a through hole 126 is formed in the center of the bottom surface 124 of the drum 122 of the housing 120 such that the coupling protrusions 135 passes through the through hole; and assembly holes (a reference numeral omitted) are formed in the center of the bottom surface of a coupling drum 102 of the lever bracket 100 such that the coupling protrusions 135 are fitted to the assembly holes.

Accordingly, the coupling protrusions 135 of the clutch cam 134 pass through the through hole 126 of the center of the housing 120, and are inserted into and welded to the assembly holes formed in the coupling drum 102 of the lever bracket 100, so the clutch cam 134 is mounted to the lever bracket 100.

In addition, the lever bracket 100 and the clutch cam 134 are required to be rotated on the same rotating axis, and the brake device 140 is also required to be rotated on the same rotating axis as the rotating axis of the clutch cam 134 so that operation noise and the wear of parts can be prevented.

To this end, although not shown in the drawings, a spindle passes through the lever bracket, the clutch cam, and the brake device on the rotating axis of each thereof to be coupled thereto, so the parts can be rotated on the same rotating axis.

However, in such a conventional pumping device, multiple protrusions and holes are required to be formed on the clutch cam and the lever bracket, respectively, such that the lever bracket, the clutch cam, and the brake device have one rotating axis while the lever bracket and the clutch cam are coupled to each other, and further, a separate spindle is required, so man-hours are increased and manufacturing cost is increased.

In addition, welding is applied to the coupling protrusions and the assembly holes by which the lever bracket and the clutch cam are coupled to each other, and even to the spindle fitted into the lever bracket, so four welding points are generated. That is, a welding operation is performed on multiple welding points, so thermal deformation of parts may occur and the quality of an assembled part may be poor.

Furthermore, while the housing is fixed to the seat cushion, the lever bracket is rotated, so the lever bracket is required to be assembled with the housing, with a predetermined gap therebetween.

Accordingly, in the related art, the spring guide 110 is provided between the lever bracket and the housing, so a gap is provided between the lever bracket and the housing. To define the gap, the spring guide cannot be removed, so the number of parts is increased.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a clutch cam for a pumping device, wherein the shape of the clutch cam and the coupling structure between the clutch cam and parts coupled thereto are changed to reduce manufacturing cost and improve assembly performance.

In order to achieve the above objectives, according to one aspect of the present invention, there is provided a clutch cam for a pumping device, the clutch cam configured to be provided in a housing fixed to a seat cushion and coupled to a lever bracket such that the clutch cam rotates together with a lever, the clutch cam including: a cam part having a cam profile provided along an outer circumferential surface thereof relative to a rotating axis of a center thereof; a first protrusion part provided on a side of the cam part, protruding therefrom toward the lever bracket on the same rotating axis as the cam part, and fitted to a fixing hole provided in the lever bracket; and a second protrusion part provided on the side of the cam part, protruding therefrom toward the lever bracket on the same rotating axis as the cam part, and fitted to an angle determination hole provided in the housing to be rotated relative to the rotating axis, wherein in a process of rotation of the second protrusion part, a portion of the second protrusion part is held by a portion of the angle determination hole such that a maximum rotational angle of the clutch cam is determined.

The second protrusion part may be provided integrally on a surface of the side of the cam part by having a predetermined step, and the first protrusion part may be provided integrally on a surface of a side of the second protrusion part by having a predetermined step.

The fixing hole may be provided in a center of a lever bracket drum, an axial center of the fixing hole being coaxial with an axial center of the first protrusion part such that the first protrusion part is fitted to the fixing hole, and the angle determination hole may be provided in a center of a housing drum, an axial center of the angle determination hole being coaxial with an axial center of the second protrusion part such that the second protrusion part is fitted to the angle determination hole.

The fixing hole may be provided in a key groove shape in the lever bracket, and the first protrusion part may be provided in a key shape corresponding to the key groove shape to be fitted to the fixing hole.

The first protrusion part may pass through the angle determination hole, be fitted to the fixing hole, and be welded to the fixing hole while being fitted thereto.

The second protrusion part may be configured by comprising a cylindrical part having the same rotating axis as the cam part and provided to have a cylindrical shape; and a stopper part provided on a portion of an outer circumferential surface of the cylindrical part by protruding therefrom in a radial direction, and the angle determination hole may be configured by comprising a cylinder part having the same rotating axis as the cam part and provided in a cylindrical shape such that the cylindrical part is fitted thereto, and a piercing part provided in a shape in which a portion of an inner circumferential surface of the cylinder part is indented in an outer radial direction thereof to be provided at a position corresponding to the stopper part, and defining a section in which the stopper part can be rotated while tracing a predetermined rotation trajectory.

The outer circumferential surface of the cylindrical part may be in contact with an inner circumferential surface of the cylinder part when the cylindrical part is coaxially fitted to the cylinder part.

A length of the piercing part in a circumferential direction thereof may be configured to be longer than a length of the stopper part in a circumferential direction thereof, so a rotational section of the stopper part may be provided.

The stopper part may be provided in an arc shape relative to the rotating axis, and the piercing part may be provided in an arc shape relative to the rotating axis, wherein in a process of the rotation of the stopper part, a side surface of the stopper part may be supported by a side surface of the piercing part facing the side surface of the stopper part, so the rotation of the stopper part may be limited.

The stopper part may be rotated while a convex curved surface having the arc shape of the stopper part is in contact with a concave curved surface having the arc shape of the piercing part.

The curved surface of the stopper part and the curved surface of the piercing part may be configured to have the same curvature.

The stopper part may be provided in plural at the same intervals along a circumferential direction of the cylindrical part, and the piercing part may be provided in plural at the same intervals at positions corresponding to the stopper parts along a circumferential direction of the cylinder part, so each of the stopper parts may be simultaneously supported by each of the piercing parts corresponding thereto.

A thickness of the second protrusion part may be configured to be larger than a thickness of the angle determination hole of the housing, so the second protrusion part may be in contact with the lever bracket while being fitted to the angle determination hole, whereby a predetermined gap may be provided between the housing and the lever bracket.

According to the present invention, the single first protrusion part provided on the clutch cam is fitted to the single fixing hole formed in the lever bracket such that the clutch cam and the lever bracket are coupled to each other, whereby the coupling structure of the clutch cam and the lever bracket to each other is simplified. Furthermore, the second protrusion part formed on the clutch cam is coaxially fitted to the angle determination hole formed in the housing, so without a separate spindle, the clutch cam is rotated on the same rotating axis as the rotating axis of the center of the housing, whereby the number of parts is reduced, an assembly process is simplified, and manufacturing cost is reduced.

Furthermore, welding is applied to a single point at which the first protrusion part is fitted to the fixing hole, so the number of welding points is considerably reduced and the possibility of the thermal deformation of parts is minimized. Additionally, the welding point is provided on the rotating axis, so the possibility of lowering the assembly performance due to welding imbalance is eliminated.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

An exemplary embodiment of the present invention will be described in detail with reference to the accompanying drawings.

Figure 1:
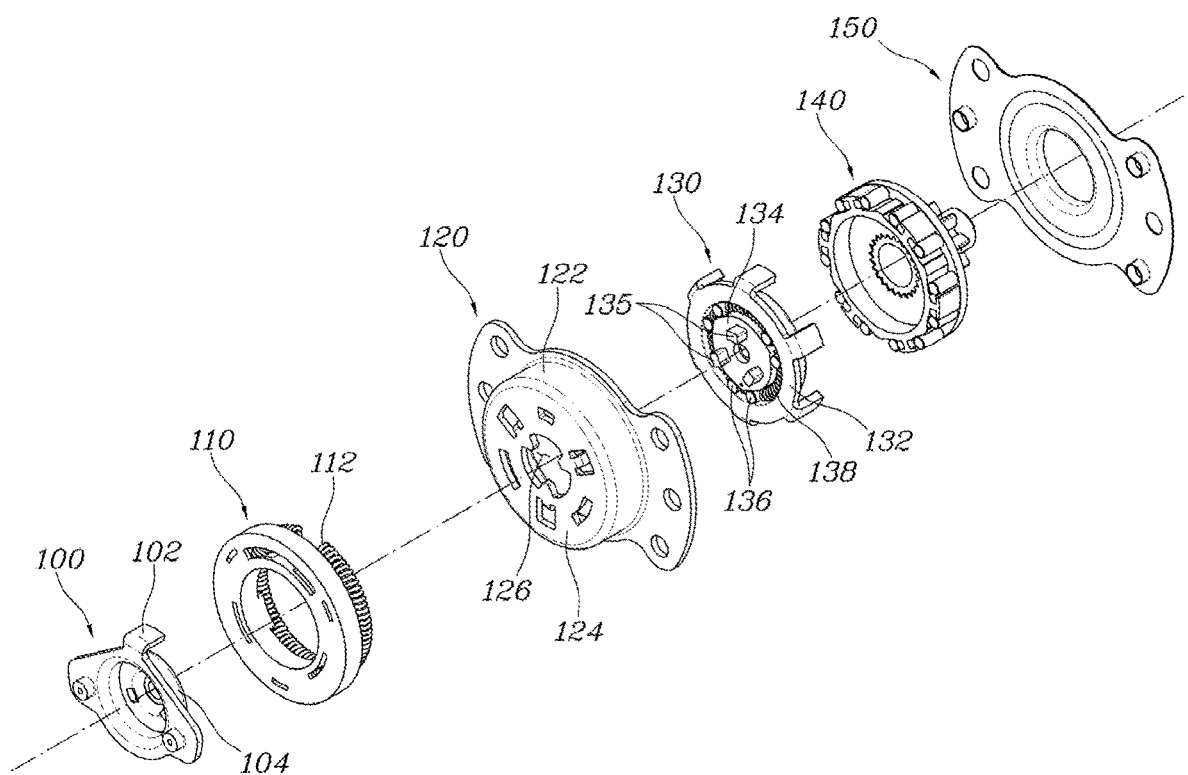
FIG. 1 is an exploded perspective view illustrating a conventional seat pumping device.
Figure 2:
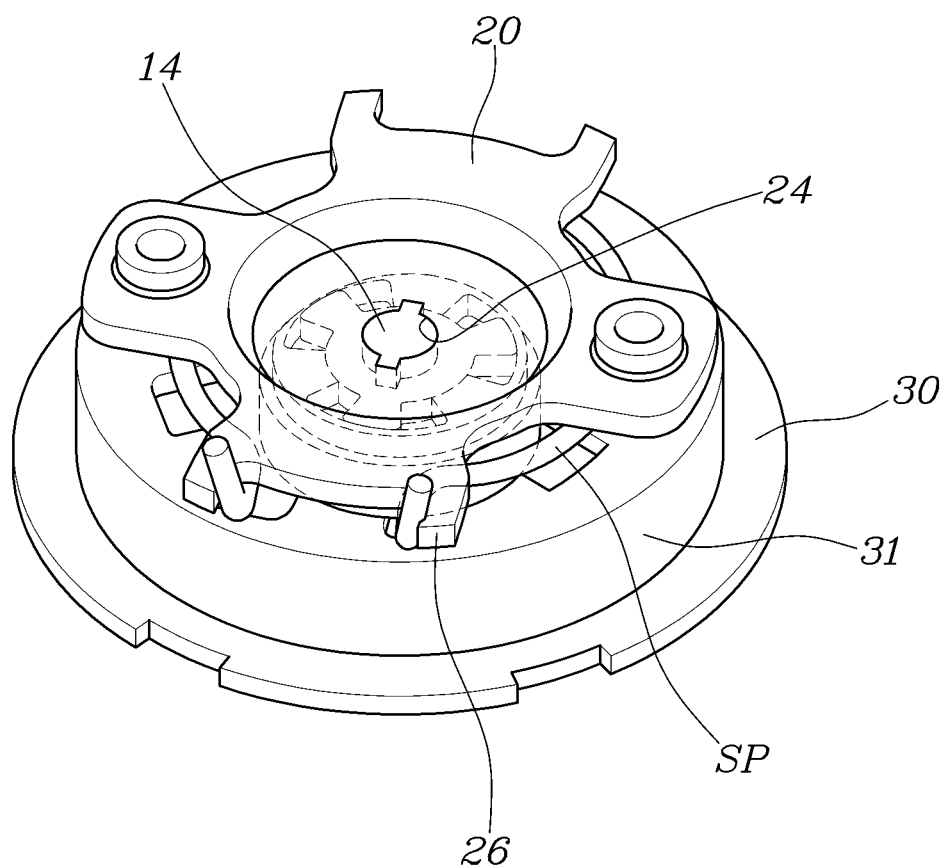
FIG. 2 is a view illustrating the coupled state of a clutch cam and a lever bracket to each other while a clutch cam of the present invention is provided inside a housing.

In a pumping device of the present invention, as illustrated in FIG. 2, a clutch cam 10 is provided in a housing 30 fixed to a seat cushion (not shown), and is configured by being coupled to a lever bracket 20 coupled to the lever such that the clutch cam 10 rotates together with a lever.

To this end, in the clutch cam 10 of the present invention, a first protrusion part 14 coupled to the lever bracket 20, and a second protrusion part 16 fitted to the housing 30 are provided at a side of a cam part 12.

Figure 9:
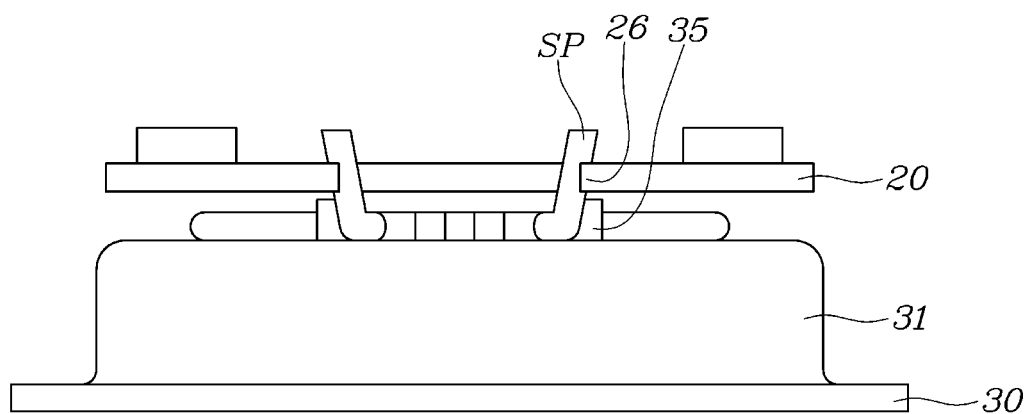
FIG. 9 is a front view of the pumping device of the present invention illustrated in FIG. 2.

In addition, in the clutch cam of the present invention, a simple spring having a C shape is provided instead of a conventional spring guide. As illustrated in FIGS. 2 and 9, the spring SP is provided between the lever bracket 20 and the housing 30, and opposite ends of the spring SP are held by the protrusion 26 of the lever bracket and the protrusion 35 of the housing, so the spring SP provides a restoring force to the lever bracket 20 relative to the housing 30 during the rotation of the lever bracket 20.

In the clutch cam of the present invention, the spring guide is removed to reduce the weight of the clutch cam and make the structure thereof compact, and the coaxial structure of the conventional spring guide is replaced with the protrusion parts 14 and 16 of the clutch cam 10.

Figure 3A:
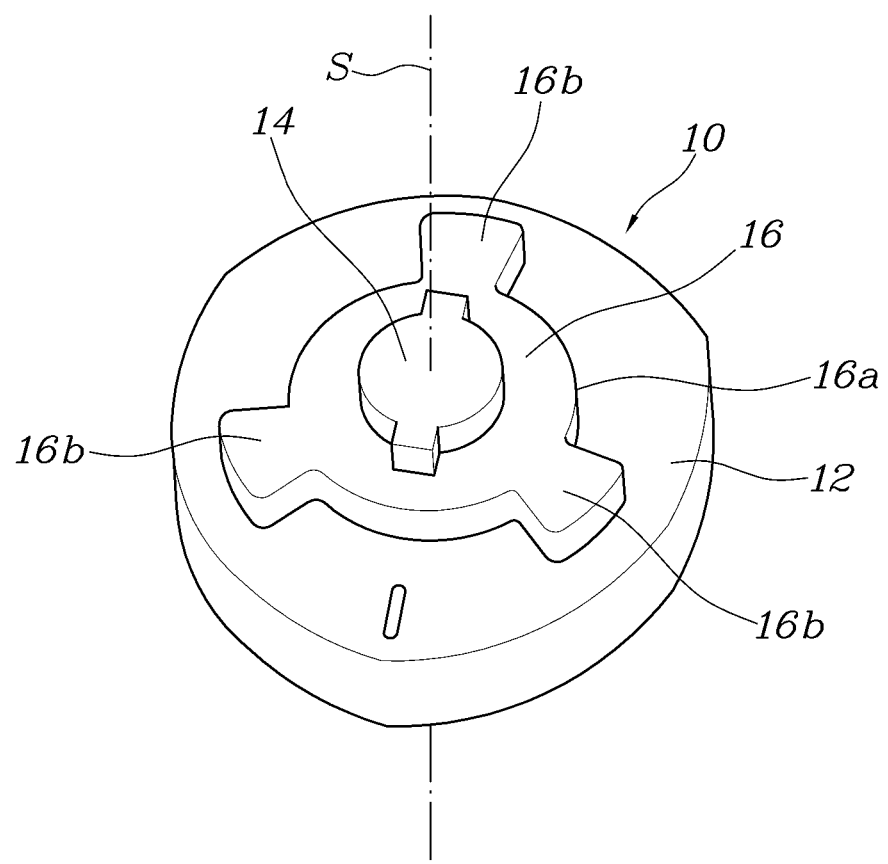
FIGS. 3A, 3B, 4A, and 4B are views illustrating the comparison of the shapes of the clutch cam of the present invention and an existing clutch cam.

Referring to the drawings, the configuration of the present invention will be described in detail. As illustrated in FIG. 3A, the cam part 12 includes a cam profile provided along an outer circumferential surface thereof relative to the rotating axis S.

Figure 5A:
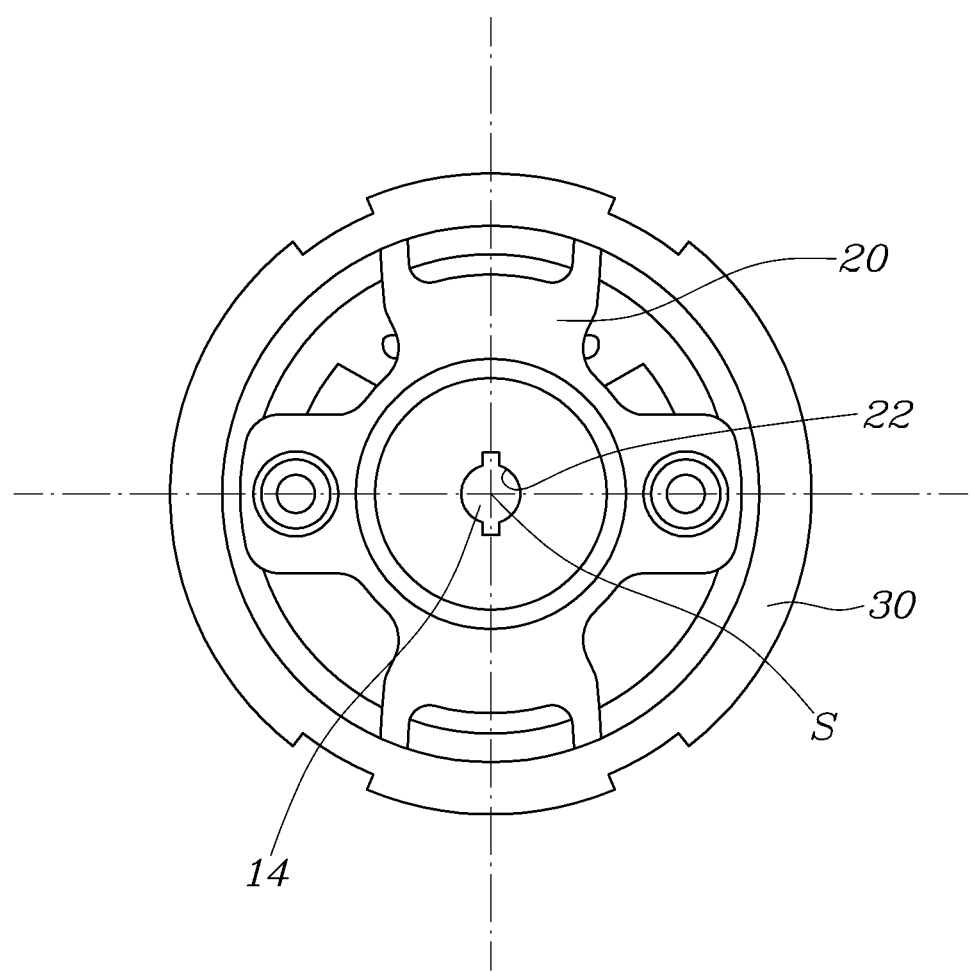
FIGS. 5A and 5B are views illustrating the comparison of the coupling structure of the clutch cam and the lever bracket according to the present invention and the conventional art, respectively.

Furthermore, as illustrated in FIGS. 3A and 5A, the first protrusion part 14 is provided on a side of the cam part 12 by protruding therefrom toward the lever bracket 20 on the same rotating axis as the rotating axis S, and is fitted to a fixing hole 24 formed in the lever bracket 20.

Figure 6:
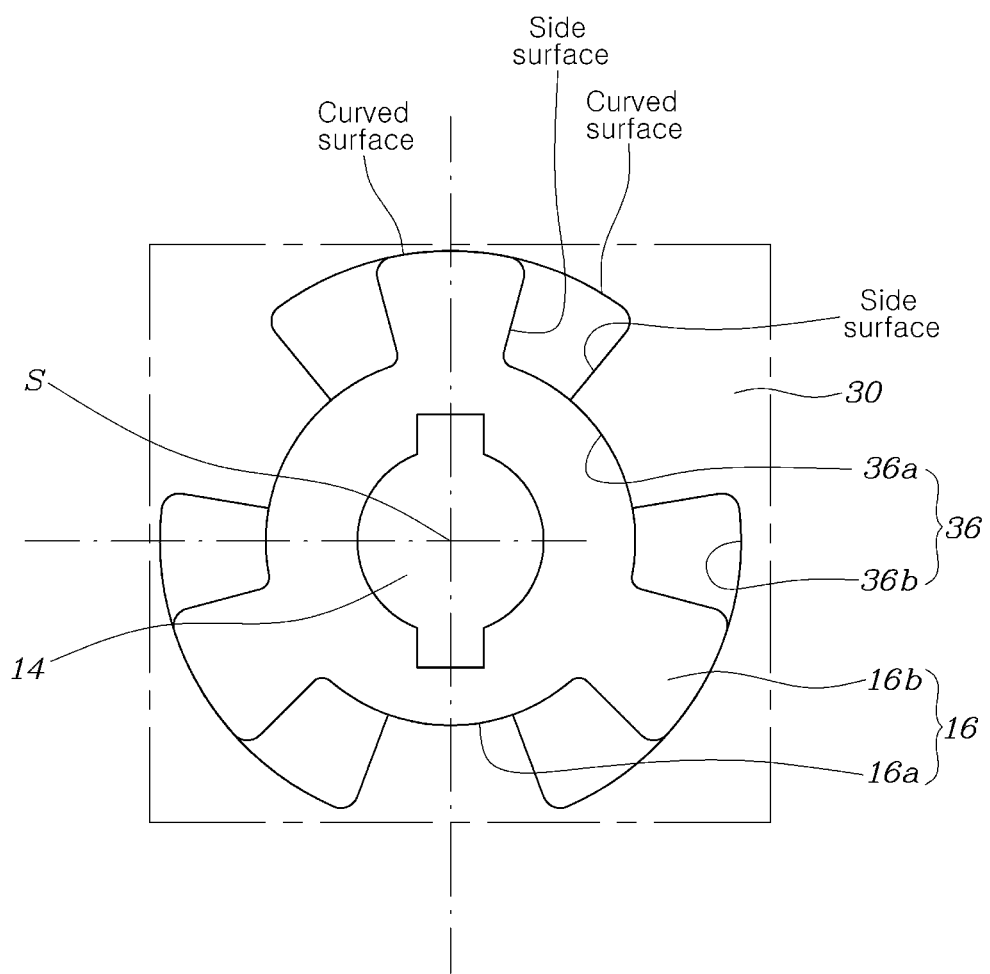
FIG. 6 is a view illustrating the enlargement of the shape of a second protrusion part of the clutch cam fitted to an angle determination hole of the housing according to the present invention.

In addition, as illustrated in FIGS. 3A and 6, the second protrusion part 16 is provided on the side of the cam part 12 by protruding therefrom toward the lever bracket 20 on the same rotating axis as the rotating axis S, and is fitted to an angle determination hole 36 formed in the housing 30 to be rotated relative to the rotating axis S. In this case, in the process of the rotation of the second protrusion part 16, a portion of the second protrusion part 16 is held by a portion of the angle determination hole 36 such that the maximum rotational angle of the clutch cam 10 is limited.

Figure 3B:
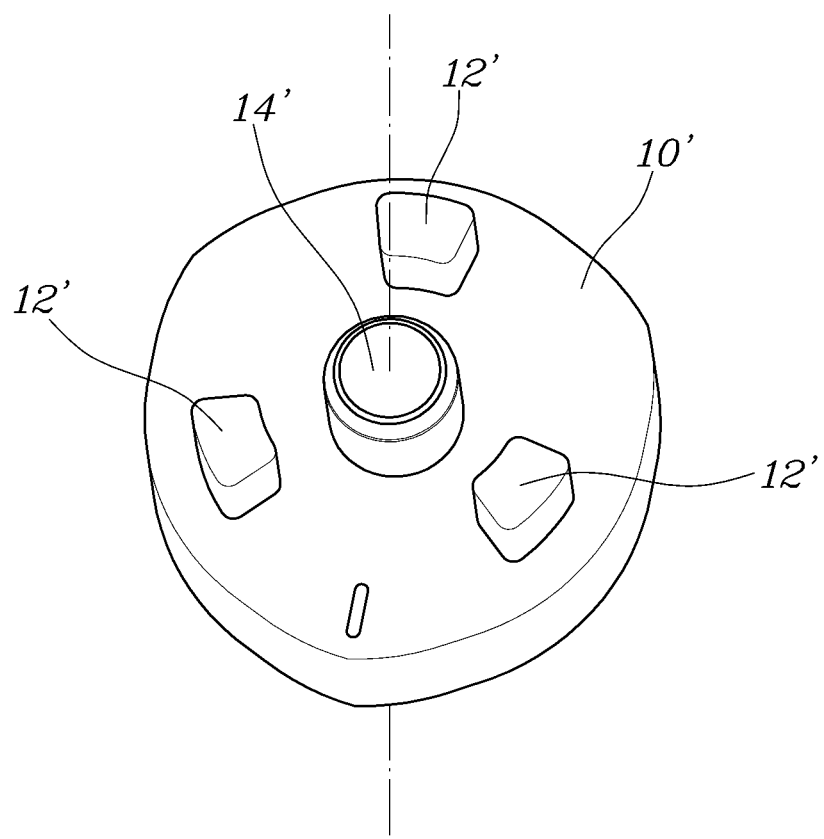
Figure 5B:
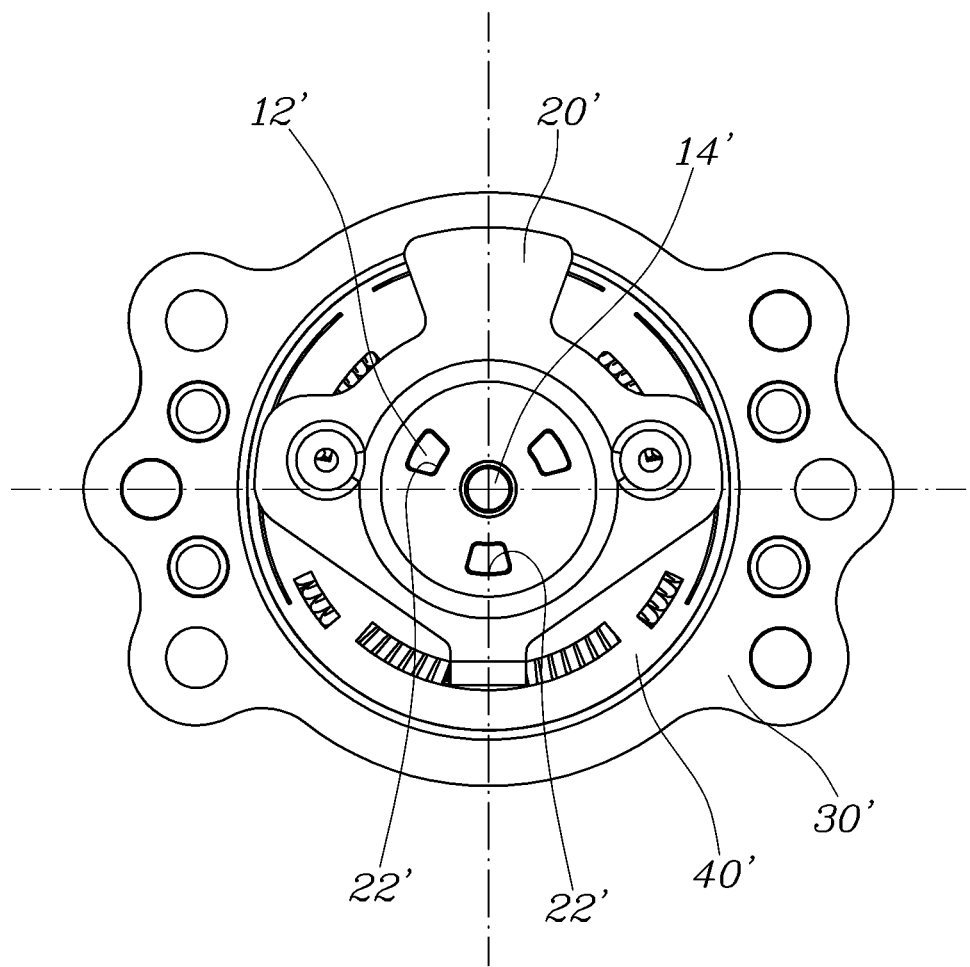

That is, in the related art, as illustrated in FIGS. 3B and 5B, multiple coupling protrusions 12' provided on a clutch cam 10' are fitted to multiple assembly holes 22' formed in a lever bracket 20' to be assembled with each other. However, in the present invention, as illustrated in FIG. 5A, the single first protrusion part 14 formed on the rotating axis S of the clutch cam 10 is fitted to the single fixing hole 24 formed on the rotating axis S of the lever bracket 20 such that the clutch cam 10 and the lever bracket 20 are coupled to each other. Accordingly, the coupling structure of the clutch cam 10 and the lever bracket 20 is simplified.

Figure 4A:
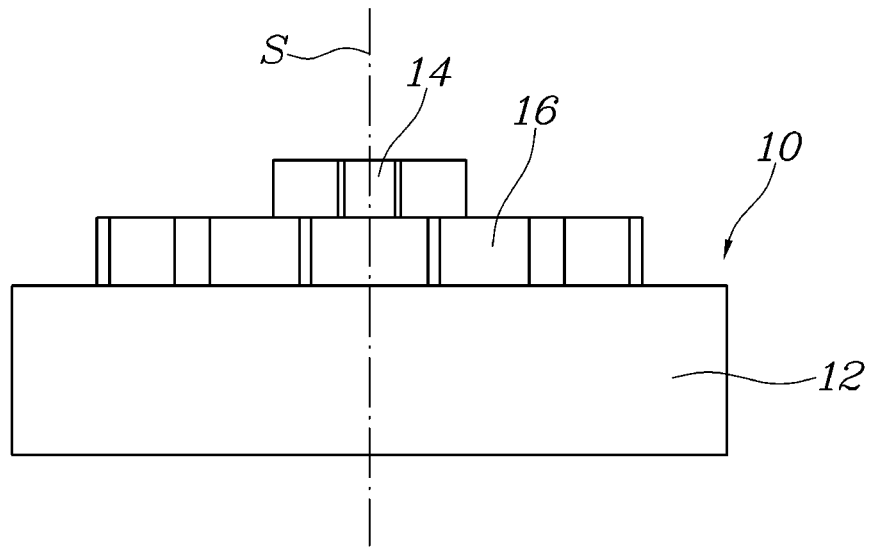
Figure 4B:
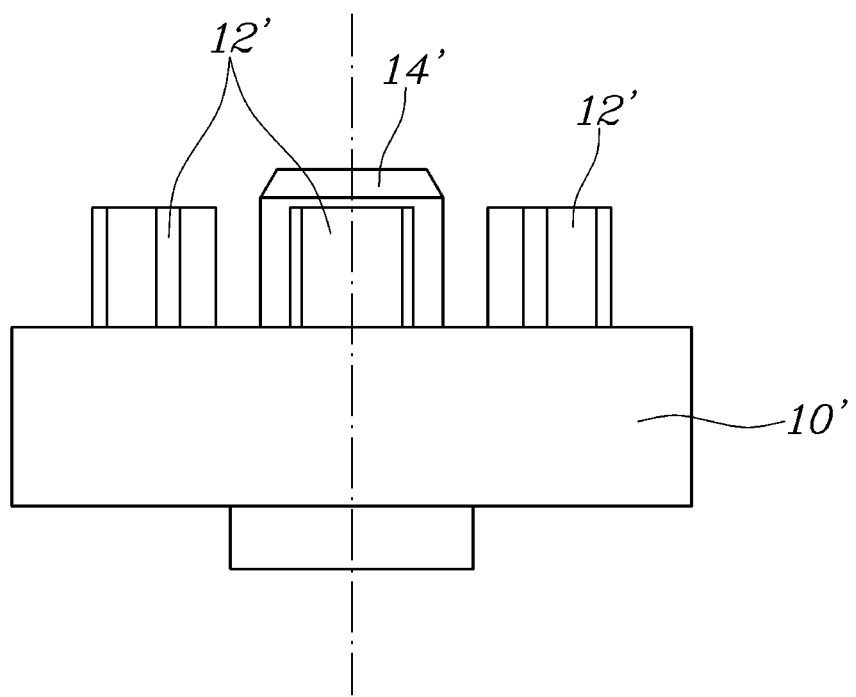

Furthermore, in the related art, as illustrated in FIGS. 3B and 4B, a separate spindle 14' is coupled to a spindle cam 10' and the lever bracket 20' to form the rotating axis S. However, in the present invention, as illustrated in FIGS. 3A and 6, the second protrusion part 16 formed on the clutch cam 10 is coaxially fitted to the angle determination hole 36 formed in the housing 30, so that without a separate spindle, the clutch cam 10 is rotated on the same rotating axis as the rotating axis S of the center of the housing 30, whereby the number of parts is reduced, an assembly process is simplified, and manufacturing cost is reduced.

In addition, the clutch cam 10 of the present invention may include the second protrusion part 16 and the first protrusion part 14 sequentially formed by having steps on the surface of the cam part 12.

Referring to FIG. 4A, the second protrusion part 16 is provided integrally on a surface of a side of the cam part 12 by having a predetermined step.

Furthermore, the first protrusion part 14 is provided integrally on a surface of a side of the second protrusion part 16 by having a predetermined step.

That is, the cam part 12 has a first step, the second protrusion part 16 has a second step formed on a surface of the first step of the cam part 12, and the first protrusion part 14 has a third step formed on a surface of the second step of the second protrusion part 16.

Accordingly, the third step of the first protrusion part 14 is fitted to and coupled to the fixing hole 24 formed in the lever bracket 20 while the second step of the second protrusion part 16 passes through the angle determination hole 36 formed in the housing 30 during the assembly of the clutch cam 10 with the lever bracket 20.

Figure 7A:
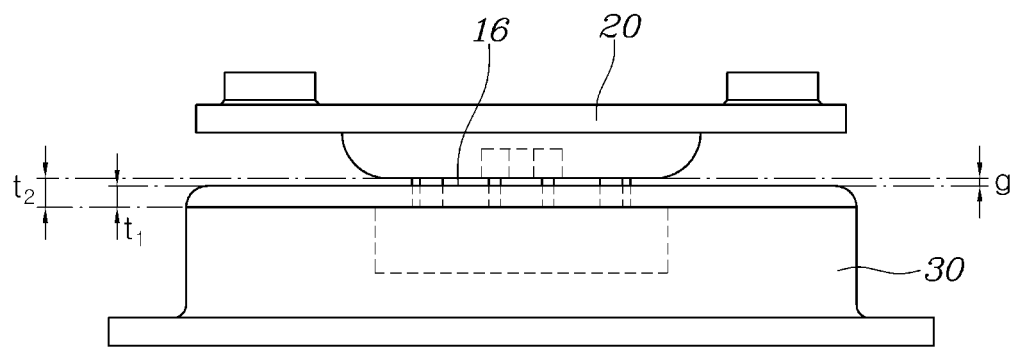
FIGS. 7A and 7B are views illustrating the comparison of the configuration of forming a gap between the lever bracket and the housing according to the present invention and the conventional art, respectively.

The coupling structure described above will be described further in detail. As illustrated in FIGS. 5A and 7A, a lever bracket drum 21 having a cylindrical shape is formed in the center of the lever bracket 20; the fixing hole 24 is formed in the center of the lever bracket drum 21; and the axial center of the fixing hole 24 is coaxial with the axial center of the first protrusion part 14 such that the first protrusion part is fitted to the fixing hole.

Furthermore, as illustrated in FIGS. 6 and 7A, a housing drum 31 having a cylindrical shape is formed in the center of the housing 30; the angle determination hole 36 is formed in the center of the housing drum 31; and the axial center of the angle determination hole 36 is coaxial with the axial center of the second protrusion part 16 such that the second protrusion part 16 is fitted to the angle determination hole.

That is, the first protrusion part 14 is concentrically fitted to the fixing hole 24, and the second protrusion part 16 is concentrically fitted to the angle determination hole 36, so the lever bracket 20 and the clutch cam 10 are rotated on the same rotating axis S relative to the angle determination hole 36 formed in the housing 30 via the first protrusion part 14 and the second protrusion part 16 formed on the clutch cam 10. Accordingly, operation noise and the problem of durability of parts that may occur when the parts have different rotating axes S can be eliminated.

Additionally, referring to FIG. 5A, in the present invention, the fixing hole 24 is formed in a key groove shape in the lever bracket 20, and the first protrusion part 14 is formed in a key shape corresponding to the key groove shape to be fitted to the fixing hole 24.

That is, the fixing hole 24 is formed in the key groove shape indented outward at opposite ends of an inner circumferential surface thereof, and the first protrusion part 14 is formed in the key shape of protruding outward from opposite ends of an outer circumferential surface thereof in a shape corresponding thereto, so the first protrusion part 14 is fitted to the fixing hole 24.

In this case, the first protrusion part 14 passes through the angle determination hole 36, and is fitted to the fixing hole 24, whereby the first protrusion part 14 can be welded to the fixing hole 24 while being fitted thereto.

That is, in the related art, as illustrated in FIGS. 3B and 5B, welding is applied to each part at which the multiple coupling protrusions 12' formed on the clutch cam 10' are fitted to the multiple assembly holes 22' formed in the lever bracket 20', and welding is applied even to a portion at which the spindle 14' is coupled to the lever bracket 20', whereby welding points are increased and the thermal deformation of parts occur.

However, in the present invention, the first protrusion part 14 is fitted to the fixing hole 24 to be welded thereto at a single point, whereby the number of the welding points is considerably reduced, and the possibility of the thermal deformation of parts is minimized. Additionally, the welding point is formed on the rotating axis S, so the possibility of lowering the assembly performance due to welding imbalance can be eliminated.

Meanwhile, in the present invention, as illustrated in FIG. 6, the second protrusion part 16 is configured by including: a cylindrical part 16a being coaxial with the rotating axis S and formed in a cylindrical shape, and a stopper part 16b formed on a portion of the outer circumferential surface of the cylindrical part 16a by protruding therefrom in a radial direction.

Furthermore, the angle determination hole 36 is configured by including: a cylinder part 36a having the same rotating axis as the rotating axis S and formed in a cylindrical shape such that the cylindrical part 16a is fitted thereto; and a piercing part 36b formed in a shape in which a portion of the inner circumferential surface of the cylinder part 36a is indented in an outer radial direction thereof to be provided at a position corresponding to the stopper part 16b, and defining a section in which the stopper part 16b can be rotated while tracing a predetermined rotation trajectory.

That is, when the cylindrical part 16a is fitted to the cylinder part 36a, the stopper part 16b is located in the piercing part 36b, so during the rotation of the clutch cam 10, the stopper part 16b is rotated in the piercing part 36b. Accordingly, the maximum rotational angle at which the stopper part 16b can be rotated in the piercing part 36b is determined, so the rotational angle of the lever coupled to the clutch cam 10 can be determined.

In addition, the outer circumferential surface of the cylindrical part 16a may be in contact with the inner circumferential surface of the cylinder part 36a when the cylindrical part 16a is coaxially fitted to the cylinder part 36a.

That is, the cylindrical part 16a is rotated while the outer circumferential surface of the cylindrical part 16a is in close contact with the inner circumferential surface of the cylinder part 36a. Accordingly, without the separate spindle, the clutch cam 10 is rotated on the same rotating axis as the rotating axis S of the center of the housing 30, whereby the number of parts is reduced, the assembly process is simplified, and manufacturing cost is reduced.

Additionally, the length of the piercing part 36b in a circumferential direction thereof is configured to be longer than the length of the stopper part 16b in a circumferential direction thereof, so the rotational section of the stopper part 16b is provided.

Furthermore, the stopper part 16b is formed in an arc shape relative to the rotating axis S, and the piercing part 36b is formed in an arc shape relative to the rotating axis S.

Accordingly, in the process of the rotation of the stopper part 16b, a side surface of the stopper part 16b continuing from the curved surface thereof is supported by a side surface of the piercing part 36b facing the side surface, so the rotation of the stopper part 16b is limited.

For example, when the clutch cam 10 is rotated clockwise, the stopper part 16b is rotated to the right side. Then when the right side surface of the stopper part 16b is supported by the side surface of the piercing part 36b facing the right side surface, the rotation of the stopper part 16b is limited, and the rotation of the clutch cam 10 is limited.

Accordingly, the rotational angle of the lever coupled to the clutch cam 10 can be determined according to the length of the arc of the stopper part 16b and the length of the arc of the piercing part 36b.

Furthermore, the stopper part 16b and the piercing part 36b are formed in arc shapes relative to the rotating axis S. Accordingly, when the side surface of the stopper part 16b is supported by the side surface of the piercing part 36b, the side surface of the stopper part 16b is in surface contact with the side surface of the piercing part 36b.

Accordingly, the side surface of the stopper part 16b is supported at a relatively uniform surface pressure by the side surface of the piercing part 36b, so the problem of the durability of parts due to stress imbalance can be eliminated, and the stopper part 16b can be more securely supported to be stopped.

In addition, while a convex curved surface having an arc shape of the stopper part 16b is in contact with a concave curved surface an arc shape of the piercing part 36b, the stopper part can be rotated.

Preferably, the curved surface of the stopper part 16b and the curved surface of the piercing part 36b may be configured to have the same curvature.

That is, while the outer circumferential surface of the cylindrical part 16a is in contact with the inner circumferential surface of the cylinder part 36a, and the curved surface of the stopper part 16b is in contact with the piercing part 36b, the clutch cam 10 is rotated, so the second protrusion part 16 can be more stably rotated without shaking or tilting inside the angle determination hole 36, whereby noise occurring during the operation of the device can be reduced.

Additionally, in the present invention, the stopper part 16b is provided in plural at the same intervals along the circumferential direction of the cylindrical part 16a.

Furthermore, the piercing part 36b is provided in plural at the same intervals at positions corresponding to the stopper parts 16b along the circumferential direction of the cylinder part 36a, so each of the stopper parts 16b is simultaneously supported by each of the piercing parts 36b corresponding thereto.

For example, in the present invention, three stopper parts 16b are provided at the same intervals relative to the cylindrical part 16a, and three piercing parts 36b are provided at the same intervals relative to the cylinder part 36a, so during the rotation of the clutch cam 10, the three stopper parts 16b are rotated together with the clutch cam, and can be simultaneously supported by side surfaces of the three piercing parts.

Accordingly, the stopper part 16b is further securely and stably supported to be stopped, so the operational stability and operational sensitivity of the pumping device can be increased.

Figure 8:
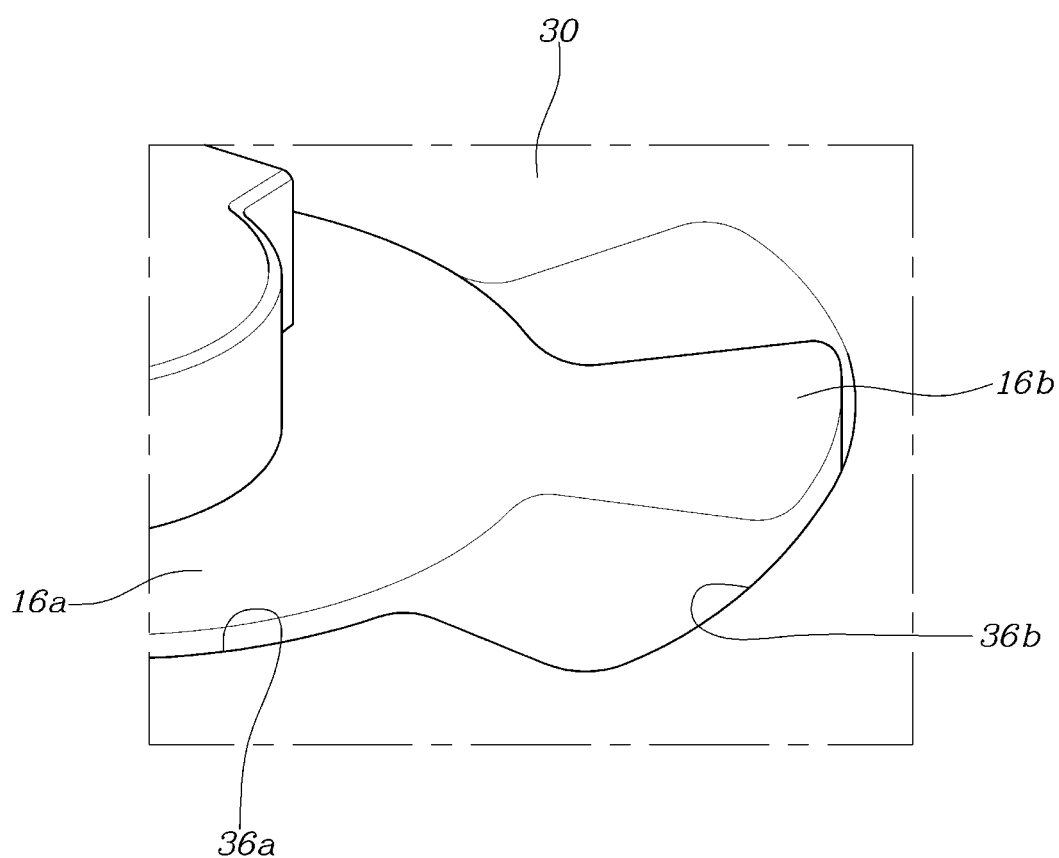
FIG. 8 is a view illustrating a state in which the second protrusion part is fitted to the angle determination hole by protruding upward from the angle determination hole provided in the housing according to the present invention.

Meanwhile, in the present invention, as illustrated in FIGS. 7A and 8, the thickness t2 of the second protrusion part 16 is configured to be larger than the thickness t1 of the housing 30 located at a portion of the angle determination hole 36, so the second protrusion part 16 is in contact with the lever bracket 20 while being fitted to the angle determination hole 36, whereby a predetermined gap g is formed between the housing 30 and the lever bracket 20.

Figure 7B:
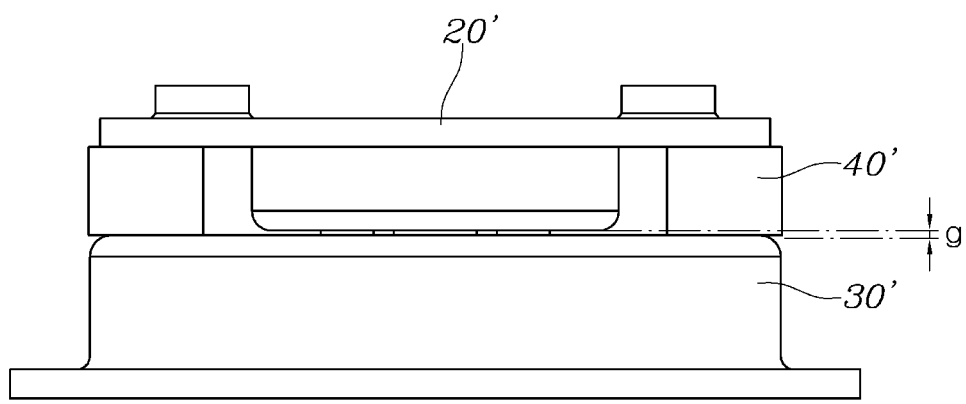

That is, in the related art, as illustrated in FIG. 7B, the spring guide 40' is located between the lever bracket 20' and the housing 30', so a predetermined gag g is maintained between the lever bracket 20' and the housing 30'.

However, in the present invention, as illustrated in FIG. 7A, the thickness of the second protrusion part 16 formed on the clutch cam 10 is set such the predetermined gap g is maintained between the lever bracket 20 and the housing 30, with the spring guide removed, whereby the second protrusion part 16 protrudes by a predetermined length out of the angle determination hole 36 while the clutch cam 10 is assembled with the housing 30.

Accordingly, when the lever bracket 20 is assembled with the clutch cam 10, the lever bracket drum 21 is seated on the second protrusion part 16 protruding out of the angle determination hole 36, so the predetermined gap g is generated and maintained between the lever bracket 20 and the housing 30, and, at the same time, the lever bracket 20 is in surface contact with the second protrusion part 16 so that movement between these parts can be minimized.

As described above, in the present invention, the single first protrusion part 14 formed on the clutch cam 10 is fitted to the single fixing hole 24 formed in the lever bracket 20 such that the clutch cam 10 and the lever bracket 20 are coupled to each other, whereby the coupling structure of the clutch cam 10 and the lever bracket 20 to each other is simplified. The second protrusion part 16 formed on the clutch cam 10 is coaxially fitted to the angle determination hole 36 formed in the housing 30, so that without the separate spindle, the clutch cam 10 is rotated on the same rotating axis as the rotating axis S of the center of the housing 30, whereby the number of parts is reduced, the assembly process is simplified, and manufacturing cost is reduced.

Furthermore, welding is applied to the single point at which the first protrusion part 14 is fitted to the fixing hole 24, so the number of welding points is considerably reduced and the possibility of the thermal deformation of parts is minimized. Additionally, the welding point is provided on the rotating axis S, so the possibility of lowering the assembly performance due to welding imbalance is eliminated.

Meanwhile, although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A clutch cam for a pumping device, the clutch cam configured to be disposed in a housing and coupled to a lever bracket such that the clutch cam rotates together with a lever, the clutch cam comprising:
   a cam part having a cam profile provided along an outer circumferential surface thereof relative to a rotating axis of a center thereof;
   a first protrusion part provided on a side of the cam part, protruding from the side toward the lever bracket, having the same rotating axis as the cam part, and fitted to a fixing hole provided in the lever bracket; and
   a second protrusion part provided on the side of the cam part, protruding from the side toward the lever bracket, having the same rotating axis as the cam part, and fitted to an angle determination hole provided in the housing to be rotated relative to the rotating axis,
   wherein, in a process of rotation of the second protrusion part, a portion of the second protrusion part is held by a portion of the angle determination hole such that a maximum rotational angle of the clutch cam is limited,
   wherein the second protrusion part comprises:
   a cylindrical part having the same rotating axis as the cam part and having a cylindrical shape; and
   a stopper part provided on a portion of an outer circumferential surface of the cylindrical part and protruding therefrom in a radial direction, and
   wherein the angle determination hole comprises:
   a cylinder part having the same rotating axis as the cam part and having a cylindrical shape such that the cylindrical part of the second protrusion part is fitted thereto; and
   a piercing part provided in a shape in which a portion of an inner circumferential surface of the cylinder part is indented in an outer radial direction thereof to be provided at a position corresponding to the stopper part, and defining a section in which the stopper part can be rotated while tracing a predetermined rotation trajectory.

2. The clutch cam of claim 1, wherein the second protrusion part is provided integrally on a surface of the side of the cam part and has a predetermined step, and the first protrusion part is provided integrally on a surface of a side of the second protrusion part and has a predetermined step.

3. The clutch cam of claim 1, wherein the fixing hole is provided in a center of a lever bracket drum, an axial center of the fixing hole being coaxial with an axial center of the first protrusion part such that the first protrusion part is fitted to the fixing hole, and
   the angle determination hole is provided in a center of a housing drum, an axial center of the angle determination hole being coaxial with an axial center of the second protrusion part such that the second protrusion part is fitted to the angle determination hole.

4. The clutch cam of claim 1, wherein the fixing hole is provided in a key groove shape in the lever bracket, and
   the first protrusion part is provided in a key shape corresponding to the key groove shape to be fitted to the fixing hole.

5. The clutch cam of claim 1, wherein the first protrusion part passes through the angle determination hole, is fitted to the fixing hole, and is welded to the fixing hole.

6. The clutch cam of claim 1, wherein the outer circumferential surface of the cylindrical part is in contact with an inner circumferential surface of the cylinder part when the cylindrical part is coaxially fitted to the cylinder part.

7. The clutch cam of claim 1, wherein a length of the piercing part in a circumferential direction thereof is configured to be longer than a length of the stopper part in a circumferential direction thereof, so a rotational section of the stopper part is provided.

8. The clutch cam of claim 7, wherein the stopper part is provided in an arc shape relative to the rotating axis, and the piercing part is provided in an arc shape relative to the rotating axis,
   wherein in a process of rotation of the stopper part, a side surface of the stopper part is supported by a side surface of the piercing part facing the side surface of the stopper part, so the rotation of the stopper part is limited.

9. The clutch cam of claim 8, wherein the stopper part is rotated while a convex-curved surface having the arc shape of the stopper part is in contact with a concave-curved surface having the arc shape of the piercing part.

10. The clutch cam of claim 9, wherein the convex-curved surface of the stopper part and the concave-curved surface of the piercing part are configured to have a same curvature.

11. The clutch cam of claim 8, wherein the stopper part comprises a plurality of stoppers respectively arranged at a same interval along a circumferential direction of the cylindrical part, and the piercing part comprises a plurality of piercing parts respectively arranged at a same interval at positions corresponding to the respective plurality of stoppers along a circumferential direction of the cylinder part, so each of the plurality of stoppers is simultaneously supported by each of the plurality of piercing parts corresponding thereto.

12. The clutch cam of claim 2, wherein a thickness of the second protrusion part is larger than a thickness of the angle determination hole of the housing, so the second protrusion part is in contact with the lever bracket while being fitted to the angle determination hole, whereby a predetermined gap is provided between the housing and the lever bracket.

13. The clutch cam of claim 1, wherein a spring is provided between the lever bracket and the housing, the spring being held by the lever bracket and the housing at opposite end parts thereof and providing a restoring force to the lever bracket relative to the housing.

\* \* \* \* \*